United States Patent
Suzuki et al.

(10) Patent No.: US 6,763,178 B1
(45) Date of Patent: Jul. 13, 2004

(54) METHOD AND APPARATUS FOR DIGITAL RECORDING/REPRODUCTION OF VIDEO WITH SUPERIMPOSED SUB-INFORMATION

(75) Inventors: Kazuhiro Suzuki, Kanagawa (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/406,487

(22) Filed: Sep. 27, 1999

(30) Foreign Application Priority Data

Sep. 28, 1998 (JP) .......................................... 10-272794

(51) Int. Cl.[7] .............................................. H04N 5/91

(52) U.S. Cl. ............................ 386/95; 386/98; 386/125

(58) Field of Search ............................... 386/46, 52, 65, 386/95, 111, 112, 125, 126, 98, 104, 105

(56) References Cited

U.S. PATENT DOCUMENTS 6,324,334 B1 * 11/2001 Morioka et al. ............... 386/52
6,393,196 B1 * 5/2002 Yamane et al. ............... 386/52

* cited by examiner

Primary Examiner—Huy Nguyen
(74) Attorney, Agent, or Firm—Frommer Lawrence & Haug

(57) ABSTRACT

An apparatus for recording and reproducing video data, audio data and graphics data representing sub-images such as subtitles to be superimposed with main images of the video data. Main data comprised of the video and audio data are compression encoded, multiplexed and recorded on a record medium such as a magnetic or optical disk. The graphics data are arranged in at least one file separate from the main data, and separately recorded on the recording medium. During reproduction, the graphics data file is read from the record medium at different times than the main data, and buffered separately. The arrangement and recording of the graphics data in a separate file simplifies editing and playback operations.

33 Claims, 10 Drawing Sheets

FIG. 3A
GRAPHICS_HEADER_file
| ATS(Sec) | PTS(Sec) | Duration(Sec) | Address | Length(Kbits) |
|---|---|---|---|---|
| 10 | 13 | 3 | Pointer to Page A | 600 |
| 15 | 20 | 1 | Pointer to Page B | 1000 |
| 22 | 26 | 4 | Pointer to Page C | 800 |
FIG. 3B
GRAPHICS_BODY_file
| Page A |
|---|
| Page B |
| Page C |
FIG. 4A
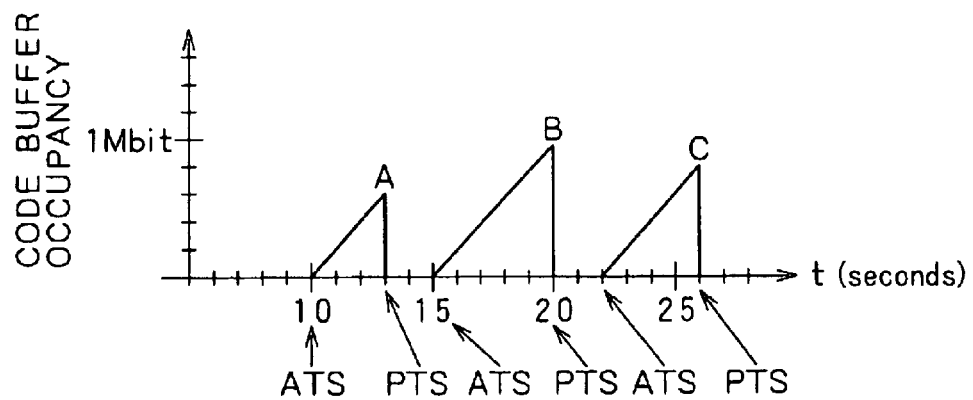
FIG. 4B
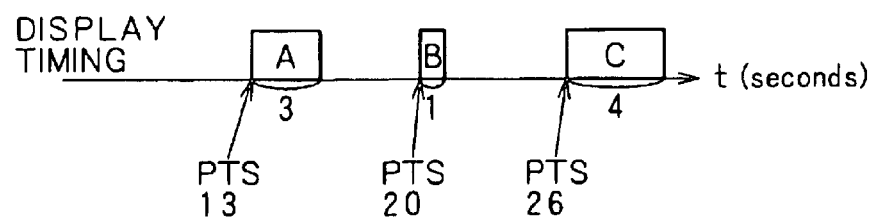

FIG. 5A
GRAPHICS_HEADER_file
| ATS(Sec) | PTS(Sec) | Duration(Sec) | Address | Length(Kbits) |
|---|---|---|---|---|
| 8 | 13 | 3 | Pointer to Page A | 600 |
| 11 | 20 | 1 | Pointer to Page B | 1000 |
| 16 | 24 | 2 | Pointer to Page D | 1200 |
| 22 | 26 | 4 | Pointer to Page C | 800 |
FIG. 5B
GRAPHICS_BODY_file
| |
|---|
| Page A |
| Page B |
| Page D |
| Page C |
FIG. 6A
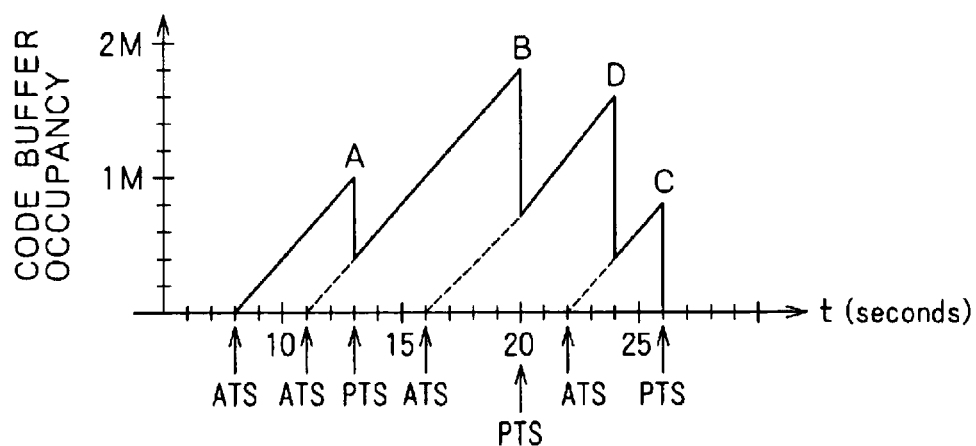
FIG. 6B
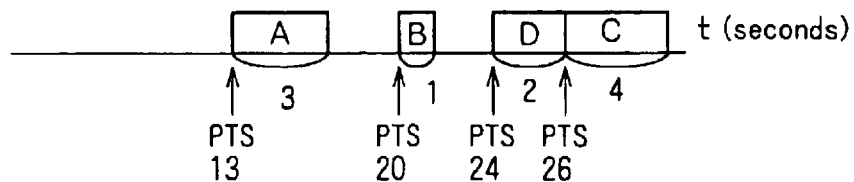

FIG. 7A
GRAPHICS_HEADER_file
| ATS(Sec) | PTS(Sec) | Duration(Sec) | Address | Length(Kbits) |
|---|---|---|---|---|
| 10 | 13 | 3 | Pointer to Page A | 600 |
| 16 | 24 | 2 | Pointer to Page D | 1200 |
| 22 | 26 | 4 | Pointer to Page C | 800 |
FIG. 7B
GRAPHICS_BODY_file
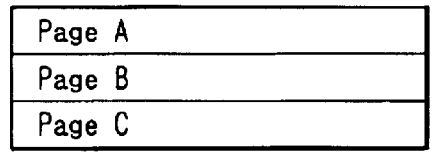
FIG. 8A
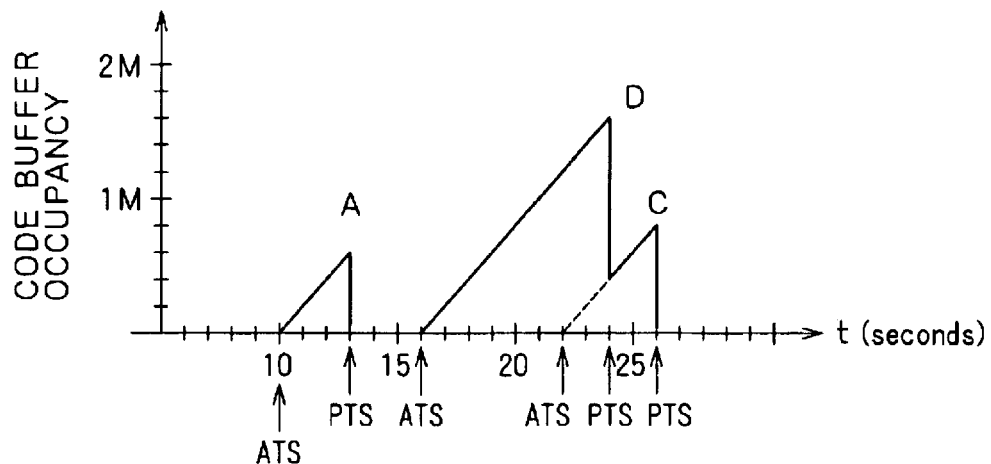
FIG. 8B
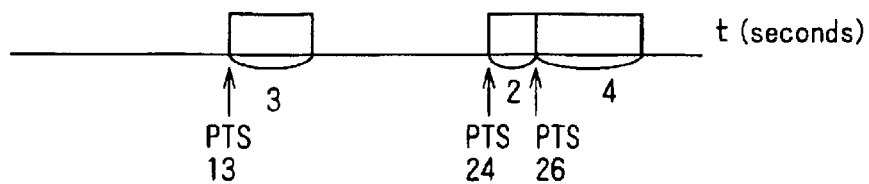

FIG. 9A

GRAPHICS_HEADER_file1

| ATS(Sec) | PTS(Sec) | Duration(Sec) | Address | Length(Kbits) |
|---|---|---|---|---|
| 10 | 13 | 3 | PageA | 600 |
| 15 | 20 | 1 | PageB | 1000 |

FIG. 9B

GRAPHICS_BODY_file1

| |
|---|
| PageA |
| PageB |

FIG. 9C

GRAPHICS_HEADER_file2

| ATS(Sec) | PTS(Sec) | Duration(Sec) | Address | Length(Kbits) |
|---|---|---|---|---|
| 16 | 24 | 2 | PageD | 1200 |
| 22 | 26 | 4 | PageC | 800 |

FIG. 9D

GRAPHICS_BODY_file2

| |
|---|
| PageD |
| PageC |

METHOD AND APPARATUS FOR DIGITAL RECORDING/REPRODUCTION OF VIDEO WITH SUPERIMPOSED SUB-INFORMATION

BACKGROUND OF THE INVENTION

1. Field of the Invention

The present invention relates generally to digital video and audio recording and reproduction, and more particularly, to the digital recording/reproduction of compressed audio/video with superimposed sub-information such as subtitles.

2. Description of the Related Art

In one approach to superimposing graphics data representing sub-images (e.g., subtitles) with main information containing digitally encoded motion picture video and audio, the main information and graphics data are time multiplexed and then recorded. Typically, MPEG (Motion Picture Experts Group) encoding is employed to compress the main information as well as the graphics data. With the MPEG technique, encoded data is organized into data blocks referred to as "access units". Within each access unit there is stored reproduction timing information representing the time at which both the main information and the superimposed graphics data of that access unit are to be output for reproduction.

A drawback of the above-noted traditional technique resides in its inherent inefficiency in certain situations. For instance, if correction of just the sub-image data ("sub-information") is desired, then all data subsequent to and including the sub-information for correction has to be isolated and then once again multiplexed after the correction is performed. Moreover, the storage of the reproduction timing information within each access unit is a cause for inefficiency when it is desired to start reproduction (playback) of the stored video program from a user-selected in-progress point of the program, i.e., a point other than the beginning of the program. That is, it becomes necessary to search for the location of the access unit corresponding to the reproduction start time of the selected in-progress point.

SUMMARY OF THE INVENTION

In view of the above-noted problems, it is an object of the present invention to provide a way to enable corrections to be made to main information and/or sub-information without the main and sub-information affecting one another.

It is another object of the invention to facilitate the retrieval of reproduction timing information in a digitally compressed audio/video program containing sub-information.

It is a general object of the invention to provide an improved digital video recording/reproduction device and method.

In an illustrative embodiment of the present invention, there is provided an apparatus and method for recording and reproducing audio/video data and graphics data representing sub-images such as subtitles to be superimposed with main images of the video data. Main data comprised of the video and audio data are compression encoded, multiplexed and recorded on a record medium such as an optical or magnetic disk. The graphics data are arranged in at least one file separate from the main data, and separately recorded on the record medium. During reproduction, the graphics data file is read from the record medium at different times than the main data, and buffered separately. The arrangement and recording of the graphics data in its own file(s) simplifies editing and playback operations.

Preferably, a graphics header file is also created and stored separately from the main data, and separately from the file(s) containing the graphics data. The graphics header file contains information relating to the graphics data, such as presentation times at which individual pages of the graphics data are to be decoded and displayed, and arrival times at which the pages are to arrive at a code buffer for temporary storage prior to being displayed. Another file may also be stored on the record medium, which file contains read times at which the pages are to be read from the record medium.

BRIEF DESCRIPTION OF THE DRAWINGS

The following detailed description, given by way of example and not intended to limit the present invention solely thereto, will best be appreciated in conjunction with the accompanying drawings, in which like reference numerals denote like elements and parts, wherein:

FIG. 3 is a table illustrating contents of a GRAPHICS_HEADER_file and a GRAPHICS_BODY_file corresponding to sub-information;

FIG. 4 is a graph showing display timing and capacity of a code buffer;

FIG. 5 illustrates the GRAPHICS_HEADER file and GRAPHICS_BODY_file when a page has been added;

FIG. 6 shows a graph and table illustrating the display timing and capacity of the code buffer when a page has been added;

FIG. 7 illustrates the GRAPHICS_HEADER_file and GRAPHICS_BODY_file when a page has been deleted;

FIG. 8 is a graph showing the display timing and capacity of the code buffer when a page has been deleted;

FIG. 9 illustrates the GRAPHICS_HEADER_file and GRAPHICS_BODY_file when a page has been subdivided;

DETAILED DESCRIPTION OF PREFERRED EMBODIMENTS

Figure 1:
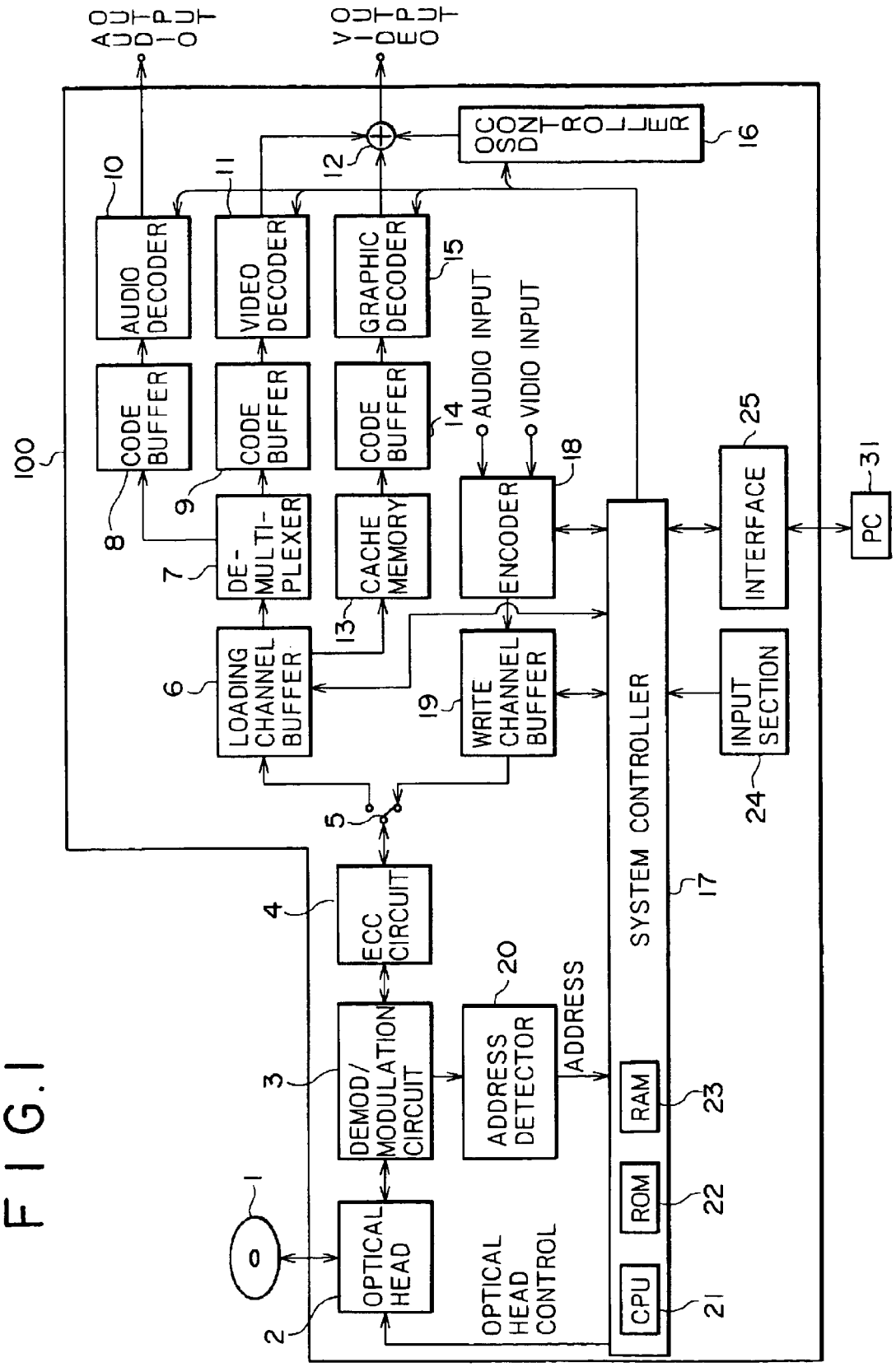
FIG. 1 is a block diagram showing the structure of a recording/reproduction device of an exemplary embodiment of the invention.

FIG. 1 is a block diagram of an illustrative embodiment of a recording/reproduction device, 100, in accordance with the present invention. As will be explained in detail hereafter, main data consisting of main video and associated audio data is compression encoded, multiplexed and recorded on record medium 1, e.g., an optical or magnetic disk. (In the description below, record medium 1 will be described in the context of an optical disk for convenience of illustration.) In addition, sub-image data is recorded on the record medium as one or more files separate from the main data, where the sub-image data represents sub-images to be superimposed with the main video. This recording technique allows for more efficient playback and editing operations in comparison to prior art systems, as will become apparent below.

Recording Mode

In the recording mode of device 100, main video data and associated audio data to be recorded on optical disk 1 are input from an external device to an encoder 18. The external device may be, for example, a personal computer, camcorder, television tuner, etc. Encoder 18 encodes this data in a compressed format such as MPEG and then outputs it to a write channel buffer 19 for temporary storage. During the recording mode, a switch 5 connects to write channel buffer 19, enabling the data in buffer 19 to be routed through switch 5 to ECC circuit 4. ECC circuit 4 adds an error code to the encoded data input thereto. Demodulation/modulation circuit 3 modulates the input data from ECC circuit 4 and then outputs this modulated data to optical head 2. Optical head 2 writes the main input data onto optical disk 1 in a time division multiplexed manner in which the main video data is multiplexed with the audio data.

System controller 17 controls the overall recording and reproduction operations of device 100, controlling optical head 2, loading channel buffer 6, audio decoder 10, video decoder 11, graphics decoder 15, OSD (On Screen Display) controller 16, encoder 18 and write channel buffer 19. The operation of system controller 17 may be in turn controllable by a program running on an optional personal computer (PC) 31 which is responsive to user inputs. System controller 17 is internally comprised of a CPU (central processing unit) 21, a ROM (Read Only Memory) 22, and a RAM (Random Access Memory) 23. CPU 21 controls the operation of system controller 17 by means of a program and data stored in ROM 22. RAM 23 functions to store data as required during recording and reproducing operations. An address detector 20 detects the address on the optical disk 1 output from circuit 3 and outputs the address to system controller 17. Note that the various blocks of device 100, while shown separately in the figure, may be integrated within a common integrated circuit and may also connect to a common bus that enables system controller 17 to communicate with the various components.

An input section 24 containing user operating keys (not shown) allows the user to specify functions such as record or reproduction (playback) on device 100 via key manipulation. Interface 25 is configured to perform interface processing of data between PC 31 and system controller 17.

PC 31 provides sub-image data to system controller 17 via interface 25. (It is noted that the term "sub-image data" is also referred to herein interchangeably as "sub-information" and as "graphics data".) One example of sub-image data is subtitles of a video program; however, the invention contemplates other types of sub-image data as well, such as advertisements, logos, titles, etc. The sub-images are synchronized using time codes and the like with the audio/video data input to encoder 18. A program running on PC 31 allows the user to specify when and where (on the main images) the sub-images are to be superimposed. CPU 21 of system controller 17 encodes the sub-image data from PC 31 in a format consistent with that used for the main audio/video data. System controller 17 arranges the encoded sub-image data in one or more files separated from the main data, and controls the recording of the sub-image data as well as the main data on optical disk 1 via suitable control of optical head 2.

The program running on PC 31 can be designed to control recording/reproduction of device 100, data transfer operations between PC 31 and system controller 17, and/or sub-image editing operations of device 100. This program is typically a program recorded on a portable record medium (not shown) such as a CD-ROM or magnetic disk readable by PC 31. Alternatively, the program may be stored remotely and downloaded to PC 31 over transmission media such as the Internet or wirelessly via a digital satellite, etc. Further, instead of employing a separate personal computer 31 to perform the tasks of running the control program, accepting user instructions, storing the sub-information for editing, etc., PC 31 and interface 25 may be eliminated by expanding the functionality of system controller 17 to perform those tasks. In this case, system controller 17 preferably includes a means for accepting the above-noted portable record medium containing the program for controlling recording and reproduction tasks.

Preferably, optical disk 1 is of the type capable of being easily erased and re-written. With this capability, an editing operation can be carried out for a disk by retrieving the data (main data and/or sub-information) and then re-writing it as desired after the editing operation is decided upon. For instance, in accordance with the method disclosed herein, pages of sub-information can be added, deleted and modified, and then an entirely new file containing all pages can be re-written to optical disk 1. As mentioned earlier, optical disk 1 can be replaced by a magnetic disk such as an HDD, in which case magnetic recording/reproducing heads are used. In cases of so-called write-once disks, which cannot be overwritten, a new disk 1 can be used to store the edited sub-information. Alternatively, an unused area, if any, of the current disk can be used to store the edited sub-information.

Figure 13:
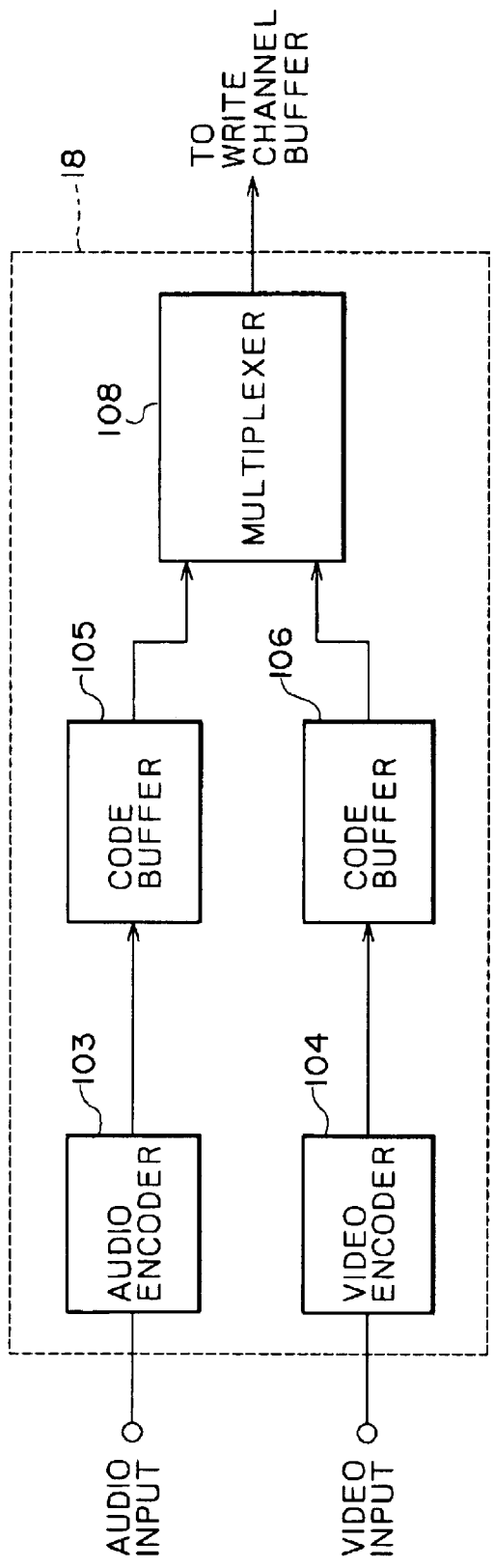
FIG. 13 is an embodiment of an encoder.

An embodiment of encoder 18 is illustrated in FIG. 13. The audio and video inputs are encoded separately by audio and video encoders 103 and 104, respectively, and buffered separately by respective code buffers 105, 106, and time division multiplexed by multiplexer 108.

Note that for certain applications, if the audio and video inputs are always supplied to device 100 in appropriate encoded format and already multiplexed, then encoder 18 would not be needed. In this case, device 100 could be embodied with a single input terminal to receive the encoded and multiplexed audio/video data.

Reproduction Mode

To reproduce data recorded on optical disk 1, optical head 2 scans the disk to generate a data signal in a conventional manner, and the data signal is input to demod/modulation circuit 3 where demodulation is performed. The demodulated data is output to an ECC (Error Correcting Code) circuit 4 which performs error correction thereon and outputs the error-corrected data to a switch 5. In the reproduction mode, switch 5 is controlled by system controller 17 to connect to loading channel buffer 6.

Loading channel buffer 6 temporarily stores the data input thereto, which may include, at any given time, main data comprised of main video and audio data, and sub-image data representing sub-images to be superimposed with the main video. The manner in which the main data and sub-image data are arranged and recorded on the optical disk will be described later. The main data buffered by load channel buffer 6 is then loaded (output) to a demultiplexer 7 where it is demultiplexed so as to separate the audio data from the main video data. The demultiplexed audio data is input to a code buffer 8 and the main video data is input to a code buffer 9. Note that the audio data and main video data at this point are still in encoded format, e.g., MPEG compressed as recorded on optical disk 1. The audio data output from code buffer 8 is decoded by audio decoder 10 in a conventional manner. Similarly, the main video data output from code buffer 9 is decoded by video decoder 11 and then output to an adder 12.

The sub-image data input to loading channel buffer 6 is output to a cache memory 13 for temporary storage. This sub-image data, which is still in encoded form, is buffered by a code buffer 14 and then output to a graphics decoder 15 for decoding. The decoded sub-image data is provided as a second input to adder 12. Adder 12 sums the main video data supplied from video decoder 11, the data input from graphics decoder 15 and data input from OSD controller 16. The summed data is output as composite video data to be displayed.

File Arrangement

Figure 2:
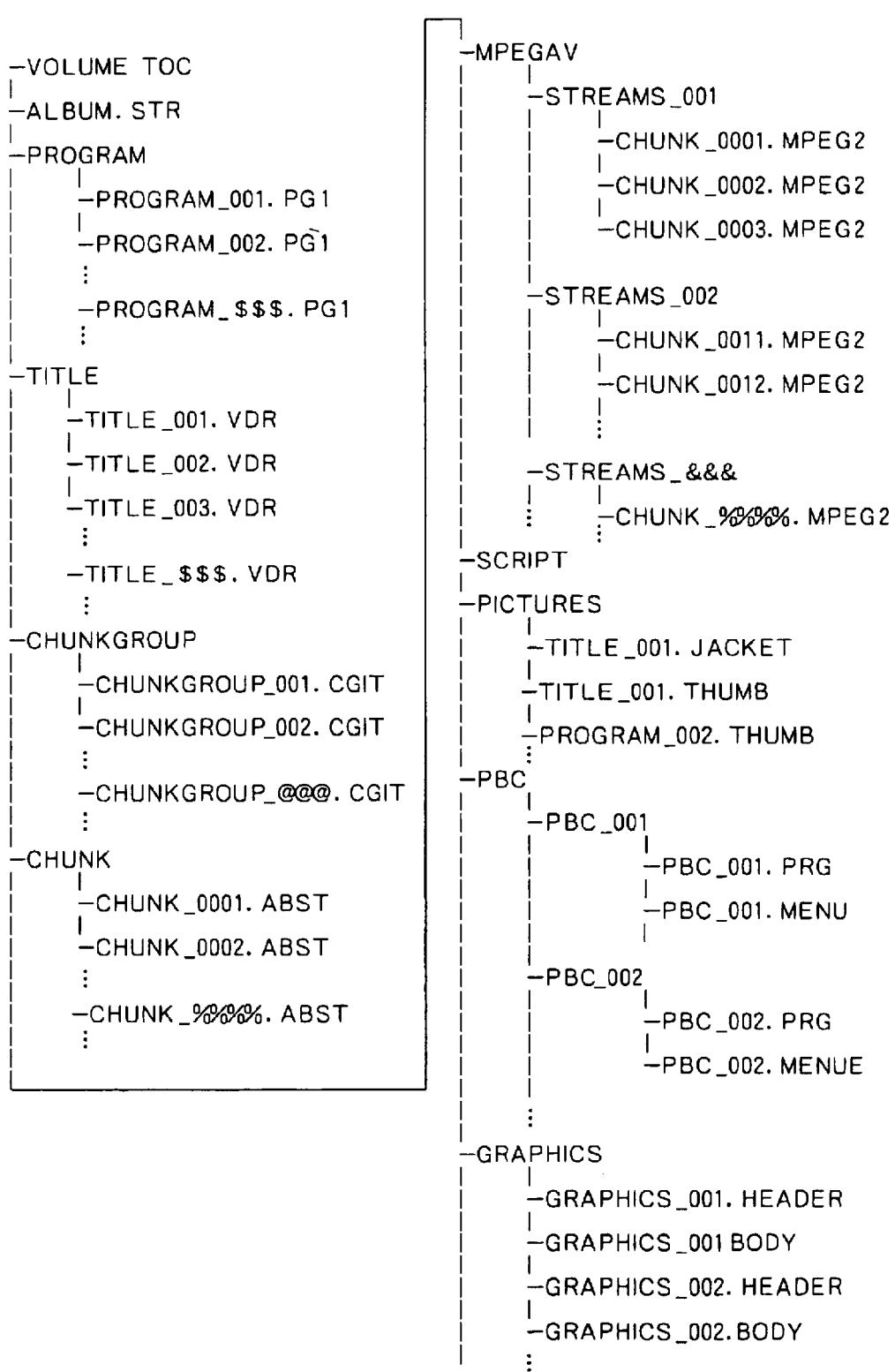
FIG. 2 is a table showing the configuration of a directory of main data files and graphics data files.

An illustrative file arrangement on record medium 1 recorded and played back in recording/reproduction device 100 will now be described. Referring to FIG. 2, the following 11 file types are recorded on the medium:

VOLUME.TOC
ALBUM.STR
PROGRAM
TITLE
CHUNKGROUP
CHUNK
MPEGAV
SCRIPT
PICTURES
PBC
GRAPHICS

The VOLUME.TOC and ALBUM.STR files are placed in a root directory (where TOC=Table of Contents; STR= string). The "PROGRAM_$$$.PGI " file names ("$$$" indicates the program number) are placed in the "PROGRAM" directory directly under the root directory. In the same way, the "TITLE_###.VDR" file names ("###" indicates the title number) are placed in the "TITLE" directory directly beneath the root directory; a list of the "CHUNKGROUP_@@@.CGIT" files ("@@@" indicates the chunk group number) is placed in the "CHUNK-GROUP" directory directly below the root directory; and a "CHUNK_%%%%.ABST" file list ("%%%%" indicates the chunk number) is placed in the "CHUNK" directory directly under the root directory.

A number of subdirectories "Streams_&&&" ("&&&" indicates the stream number) are created in a MPEGAV directory directly below the root directory, and a "CHUNK_%%%%.MPEG2" file list ("%%%%" indicates the chuck number) is placed directly under "Streams_&&&".

Typically, one VOLUME.TOC file is commonly shared on the record medium. However, a plurality of such VOLUME.TOC files are also likely to exist on specially configured media such as hybrid RAM and ROM structured media. The VOLUME.TOC file is utilized to indicate the overall characteristics of the medium.

The ALBUM.STR file is generally present as one file on the medium. However, a plurality of ALBUM.STR files are likely to be present in media with special structures such as ROM and RAM hybrids. The ALBUM.STR file is incorporated into a plurality of media and used as if there were one medium.

The PROGRAM directory contains a file list of audio/video programs, with each such program identified by one PROGRAM_$$$.PGI file name. Each program is comprised of one or more titles listed in the TITLE directory, or alternatively, of different cuts (portions) of one or more titles. Each of these cuts is played back in a specified order. The term title as referred to here is for instance one track (song) of a compact disk or one program of a television broadcast. One TITLE_###.VDR file of the "TITLE" directory is present for each title.

One CHUNKGROUP_@@@.CGIT file of "CHUNK-GROUP" is present for each chunk group. The chunkgroup has a data structure for arranging the bit stream. The CHUNKGROUP_@@@.CGIT file is transparent to the user while the user is operating equipment such as a VDR (video disk recorder) to record or reproduce data to/from the medium.

One CHUNK_%%%%.ABST file of "CHUNK" is present for each chunk, where a chunk is an information file corresponding to one stream file. The STREAMS_%%%%.MPEG2 file of "MPEGAV" is a stream file and stores the MPEG bit stream. Thus, the STREAMS_%%%%.MPEG2 file, dedicated for storing the MPEG bit stream, differs from the other files which are dedicated for recording other information.

The "SCRIPT" is a directory for storing information relating to the script. Files containing images such as thumbnail images (e.g., TITLE_001.THUMB, PROGRAM_002.THUMB), jacket images (e.g., TITLE_001.JACKET), still images separated from moving images, and images from digital cameras are placed in the PICTURES directory. The PICTURES directory is established in a VDR format as a support tool for still image archive applications.

"PBC" (Play Back Control) is a directory for storing information relating to playback control. "GRAPHICS" is a directory for storing a listing of graphics data files, i.e., sub-information files. The respective syntaxes for the GRAPHICS_HEADER file and the GRAPHICS_BODY_file are as follows:

```
GRAPHICS_HEADER_file{
    sub_stream_id                        8
    sub_stream_number                    8
    number_of_pages                      16
    for (i=0;i<num_of_pages;i++) {
        ATS                              32
        PTS                              32
        duration                         32
        reserve                          8
        address_of_page                  24
        reserve                          8
        page_data_length                 24
    }
}
    GRAPHICS_BODY_file(
        do{
            page ()
        }while (nextbits () =page_start_code)
    }
```

Information from the ATS (Arrival Time Stamp) through page_data_length shown in the GRAPHICS_HEADER_file is information relating to the page( ) of the GRAPHICS_BODY_file. The ATS is the time that the initial byte of that page is to arrive at code buffer 14 for temporary storage. By way of example, a clock frequency of 90 KHz can be used for the ATS to establish the arrival times. The PTS (Presentation Time Stamp) shows the decode start time for that page, indicating the time at which decoding and nearly simultaneous display of the page is to begin. The PTS may also use a clock frequency of 90 KHz. The page_data_length shows the data size for that page in byte units. The "duration" field indicates the display time duration for the corresponding page, and may likewise utilize a clock frequency of 90 KHz. In other words, the display of the corresponding page starts at the PTS time and is displayed for the length of time indicated in the "duration"

field. The "address_of_page" field is the address information for the lead (beginning) byte of the corresponding page. The beginning of the GRAPHICS_BODY_file is set at zero (0).

The "page( )" of the GRAPHICS_BODY_files is the actual state of the GRAPHICS data (compressed bit map data). One page may be designed as equivalent to a standard MPEG access unit. When a plurality of pages corresponding to the "page( )" data are to be displayed, they are reproduced in a display sequence.

Accordingly, pages of sub-information can be added by storing information such as the reproduction times for all pages in one batch in the GRAPHICS_HEADER_file and storing the page graphic data in one batch in the GRAPHICS_BODY_file. Corrections to the pages during an editing procedure can be easily made with this file arrangement.

Turning now to FIG. 3, examples of a GRAPHICS_HEADER_file and a GRAPHICS_BODY_file are shown. FIG. 4(A) shows changes in the data occupancy inside the code buffer 14 when the pages of FIG. 3 are loaded and unloaded. The timing at which the respective pages are displayed is shown in FIG. 4(B).

In the example of FIG. 3(A), the ATS is 10 seconds for Page A and the PTS is 13 seconds. Therefore, for Page A, data is loaded from the cache memory 13 to code buffer 14 in the interval from the 10th to the 13th second, and decoding/display starts from the 13th second point. The display time (duration) is set as a three second period. The page address is listed as a pointer to the page. The data capacity (size) within the GRAPHICS_BODY_file of Page A is listed here as 600 Kbits. Data relating to Page B and Page C are listed in the same way.

In the example of FIG. 3(B), the compressed graphics data of Page A, Page B and Page C are listed in sequence in the table.

With the GRAPHICS_HEADER_file and GRAPHICS_BODY_file structured in the above manner, the data occupancy of code buffer 14 (representing the amount of data currently stored therein) changes as shown in FIG. 4(A) during the reproduction mode. In this example, the size of code buffer 14 is 2 Mbit and the data transfer speed from cache memory 13 to code buffer 14 is 200 Kbps. At time t=10 seconds, representing the arrival time stamp (ATS) of Page A, the transfer of the Page A data from cache memory 13 to code buffer 14 begins. The transfer of the 600 Kbits of data in Page A is completed at t=13 s (where s denotes seconds). The time t=13 s also represents the presentation time stamp (PTS) of Page A. Thus, Page A is output from code buffer 14 at this time, thereby emptying the buffer as shown, and the page is decoded/displayed using graphics decoder 15 during the time interval shown in FIG. 4(B). The page is displayed for three seconds as specified in the duration field for Page A.

Next, at t=15 s the transfer of the data for Page B begins; this transfer is completed at t=20 s, whereupon Page B is decoded and displayed for one second as specified. The transfer of the data for Page C starts at t=22 s and ends at t=26 s; Page C is then displayed for a duration of four seconds.

In the ensuing discussion of FIGS. 5–10, various editing operations for the sub-information are described. As mentioned earlier, if recording medium 1 is of the re-writable type, sub-information written to recording medium 1 can be read, temporarily stored in the RAM 23 of system controller 17, and then re-written to recording medium 1 following the editing procedure.

FIGS. 5 and 6 illustrate an editing method by which a page of sub-information is inserted between already existing pages. In this example, a Page D is added between Pages B and C, i.e., the presentation time of Page D is to lie between that of Pages B and C. FIG. 5 {(A) and (B)} show the respective changes in the GRAPHICS_HEADER_file and GRAPHICS_BODY_file when Page D is inserted. That is, in the GRAPHICS_HEADER_file, the Page D characteristics data (ATS=16, PTS=24, etc.) is inserted between that of Pages B and C, and in the GRAPHICS_BODY_file, the graphics compression data of Page D is likewise inserted. Note that the arrival time stamp (ATS) for Page A changed from 10 to 8 seconds and the ATS for Page B changed from 15 to 11 seconds when Page D was inserted. Generally, the ATS times need to be sufficiently early to ensure that all the data for any given page arrives in code buffer 14 prior to the presentation time for that page. To ensure this condition is satisfied, the data transfer speed (leak rate) from cache memory 13 to code buffer 14 is taken into consideration.

By way of example, if the leak rate is set at 200 Kbps, then, in consideration of the sizes of the respective pages, setting the ATS of Pages A and B to 8 and 11, respectively, ensures that all the data will arrive in code buffer 14 in time to display the pages beginning at their designated PTS times.

When Page D is added in this manner, a change in the data capacity of code buffer 14 occurs as shown in FIG. 6(A). First, the transfer of Page A data from the cache memory 13 to the code buffer 14 begins at t=8 s. The transfer of the Page B data begins at t=11 s, immediately after the complete transfer of all of the Page A data to code buffer 14. In other words, the transfer of page A data is completed before the transfer of page B data starts. The transfer of Page D data starts at t=16 s; the Page C data transfer begins at t=22 s. Decoding and display of each page starts at the corresponding PTS time for that page. The display timing for this example is shown in FIG. 6(B). Page D is displayed for a 2 second period from the 24 th second in the interval between the display of Pages B and C.

In an editing operation involving deletion of a page, file changes are implemented in a similar manner to that just described; however, the ATS times need not be reset. For instance, FIG. 7 illustrates the case in which Page B is deleted from the group of FIG. 5, such that the GRAPHICS_HEADER_file and GRAPHICS_BODY_file are rewritten as shown without the Page B data. The ATS and PTS times of the respective pages remain unchanged. The deletion of Page B results in the data occupancy of code buffer 14 changing as shown in FIG. 8(A). The resulting display time is as shown in FIG. 8(B).

Figure 14:
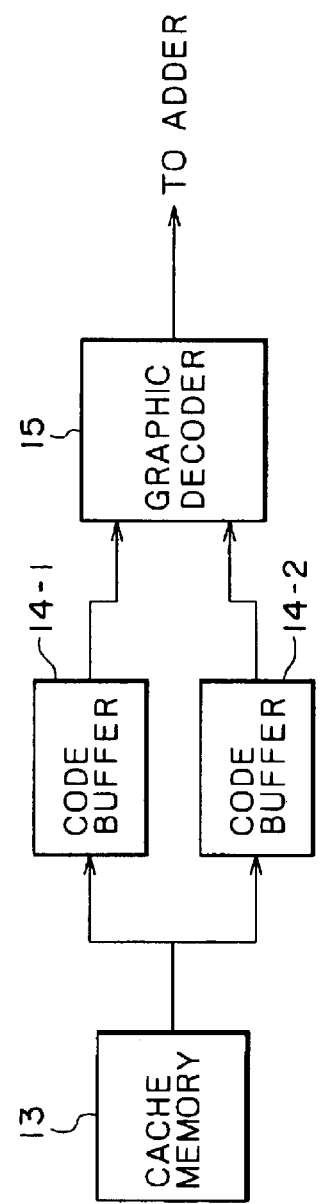
FIG. 14 illustrates a code buffer splitting technique.

To facilitate an editing operation in which changes are made to individual pages at a specified editing point, the recording/reproduction device 100 can be provided with a plurality of code buffers for the graphics data as shown in FIG. 14. In this example, two code buffers 14-1 and 14-2 are used in place of code buffer 14. Each code buffer is dedicated to buffer the graphics data of different pages, with one buffer used for the graphics data of pages preceding the editing point, and the other used for graphics data subsequent to the editing point.

In conjunction with the use of multiple code buffers as 14-1, 14-2, the files containing the graphics data and header information are split at the editing point. FIG. 9 presents an example of the GRAPHICS_HEADER_file and GRAPHICS_BODY_file being rewritten when splitting files with a time of 21 seconds as the boundary. In other words, the GRAPHICS_HEADER_file is split up into a GRAPHICS_HEADER_file 1 (FIG. 9(A)) containing Page A and Page B information and a GRAPHICS_HEADER_ file 2 (FIG. 9(C)) containing Page C and Page D information. Along with this creation of two GRAPHICS_ HEADER_files, the GRAPHICS_BODY_file is split into a GRAPHICS_BODY_file 1 (FIG. 9(B)) having graphics data for Page A and Page B, and into a GRAPHICS_ BODY_file 2 (FIG. 9(D)) having graphic data for Page C and Page D.

Figure 10:
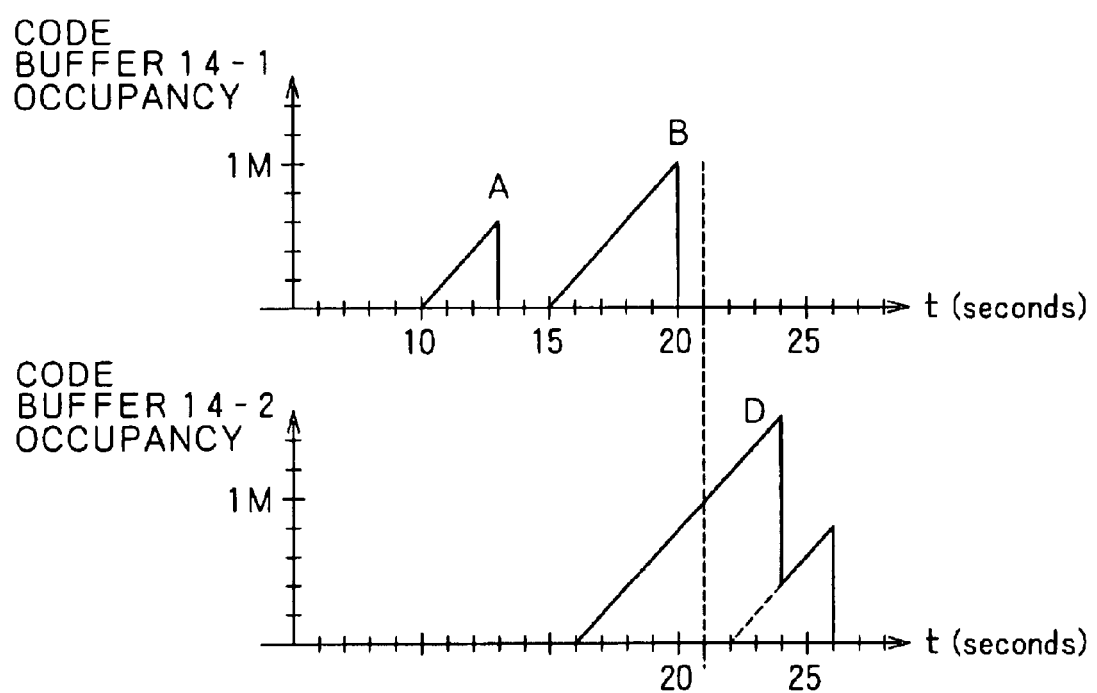
FIG. 10 is a graph depicting the display timing and capacity of the code buffer when a page has been subdivided.

When split up respectively into two files in this way, during the reproduction mode, code buffer 14-1 is supplied with data according to GRAPHICS_HEADER_file 1 and code buffer 14-2 is supplied with data according to GRAPHICS_HEADER_file 2. The changes in data occupancy within code buffers 14-1 and 14-2 are shown in FIG. 10.

As an alternative to the use of two or more code buffers as just described, one code buffer with two or more separate areas may be used to store the split files.

Accordingly, with the above-described technique of storing information such as the reproduction time and graphics data for pages to be displayed as sub-images in files separate from the main video and audio data, editing tasks such as page editions, deletions, and splitting are facilitated. The editing operations can be carried out by just editing the file portion containing the desired item for editing. More specifically, a simplified editing operation for the sub-images is performed by editing just the GRAPHICS_ HEADER_file and the GRAPHICS_BODY_file. By contrast, with the above-noted prior art systems, following an editing operation, the multiplexed main audio/video data and sub-information beyond the editing point need to be isolated and re-multiplexed, a substantially more complex process.

With reference now to the flow chart of FIG. 11, the operation of recording/reproduction device 100 of FIG. 1 will be explained, and in particular the reproduction of sub-information stored in the GRAPHICS_HEADER_file and GRAPHICS_BODY_file. A variable "LastPTS" is set to zero (0) in step S1. This LastPTS variable indicates the presentation time stamp of the last page of the GRAPHICS_ BODY_file that has been stored in the cache memory 13. Of course, at the start of reproduction no pages have yet been loaded into cache memory 13; as such, LastPTS is initially set to zero.

In step S2, the GRAPHICS_HEADER_file and GRAPHICS_BODY_file are read from optical disk 1 and loaded into cache memory 13. This process is carried out by means of system controller 17 controlling optical head 2 to scan the appropriate addresses of the disk, and the reflected optical energy is then demodulated by demod/modulation circuit 3. Error correction is performed by ECC circuit 4, and the thus retrieved files are transferred via switch 5 to loading channel buffer 6 and then to cache memory 13. The GRAPHICS_HEADER_file is loaded first, followed by the GRAPHICS_BODY_file in an amount corresponding to the remaining capacity in cache memory 13. That is, only some of the pages in the GRAPHICS_BODY_file may be loaded initially, depending on the size of the file and the cache memory capacity.

In step S3, it is determined whether or not all pages of the GRAPHICS_BODY_file (hereafter simply called graphics data) have been loaded into cache memory 13. When only some of the graphics data has been loaded and cache memory 13 is already full, then in step S4 the PTS of the last (final) loaded graphic data is stored in the LastPTS variable. When it is determined that all of the graphics data has been loaded, step S4 is skipped and the process advances to step S5. In step S3 therefore, when all graphic data has initially been loaded the value of the LastPTS variable is zero (value set in step S1) and left unchanged.

The loading of audio data and main video data from optical disk 1 starts in step S5. Optical head 2 is controlled by the system controller 17 to retrieve the audio and video data from optical disk 1 recorded in the MPEGAV directory shown in FIG. 2. This audio and video data loaded in step S5 is multiplexed data. As described previously, the reproduction process for this data involves demodulation of the data signal by demod/modulation circuit 3, error correction by ECC circuit 4, etc., with eventual decoding performed by audio and video decoders 10 and 11, respectively. The decoded audio data is output directly to an audio transducer; the decoded main video is applied to adder 12.

Concurrently with the loading and reproduction of the main audio/video data of step S5, the graphics data stored in cache memory 13 is transferred sequentially into code buffer 14 in accordance with the respective ATS times of the pages. Similarly, the buffered graphics data is sequentially decoded in graphics decoder 15, and then immediately output for superimposition and display, in accordance with the PTS times of the respective pages.

With the above-described procedure, the ability to load the main audio/video data from optical disk 1 after storing the graphics data temporarily in cache memory 13, prevents reproduction (playback) of the main audio/video data from being cut off due to the loading of sub-information from optical disk 1. Cut off can even prevented in recording/ reproduction devices with inadequate seek times and access speeds.

Figure 11:
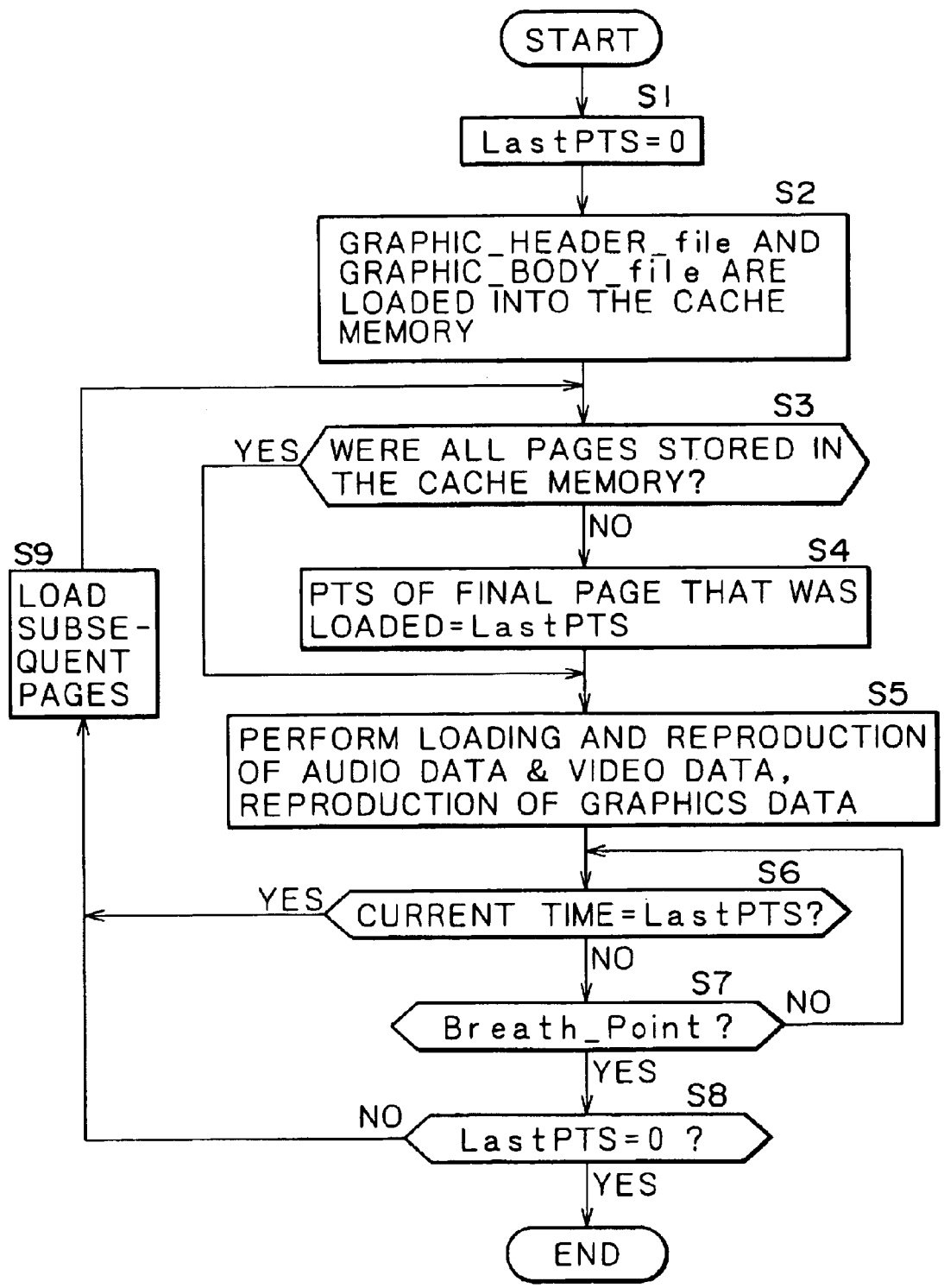
FIGS. 11 and 12 are flowcharts illustrating the operation of an illustrative embodiment of a recording/reproduction device in accordance with the invention.

With continuing reference to FIG. 11, for the condition in which cache memory S13 does not have sufficient capacity to store the graphics data for all the pages in step S3, the PTS of the last page that was loaded is set as the LastPTS variable in step S4 as mentioned earlier. As the main audio/video data and graphics data are decoded and reproduced in step S5, a check is continually made in step S6 as to whether the current time equals the LastPTS time. When the LastPTS time does arrive, indicating that all graphics data stored in cache memory 13 has been output for decoding, the procedure progresses to step S9 where subsequent pages of graphics data are loaded. That is, the GRAPHICS_BODY_ files for pages following the page with the LastPTS are loaded from the optical disk 1, the process then returns to step S3 and the subsequent processing is repeated.

During the loading of main audio and video data from optical disk 1, the loading is paused under certain conditions (e.g., when code buffers 8 and 9 fill up) and in that pause interval, audio and video might be cut off or interrupted. For instance, if the system had to wait excessively for graphics data to be read from the disk during a time when additional audio and video data needs to be read, then an interruption could occur. To prevent this from happening, a "Breath_ Point" is set, which represents an opportunistic time to read additional graphics data from the disk, rather than reading the main audio/video data. This Breath_Point is for instance set at inconspicuous positions or non-audio positions (i.e., during times of silence in the video scene) to avoid being noticed on the display even if the actual displayed video becomes momentarily paused. The loading of audio and video data is temporarily stopped at this point and the GRAPHICS_BODY_file is loaded from optical disk 1 into cache memory 13. The Breath_Point information can be arranged (by means of a program running on system controller 17 or PC 31 ) as a single file and recorded as such on optical disk 1. When the reproduction mode of device 100 is started, the file is read and stored in RAM 23 of the system controller for use during reproduction. An exemplary configuration of the Breath_Point file is as follows:

```
Breath_Point () {
    Number_of_data                          16
    For (I=0;I<Number_of_data;I++) {
        Breath_Point                        32
    }
}
```

Accordingly, in the procedure of FIG. 11, when it is determined in step S6 that the current time is not the LastPTS time, then the current time is compared to the Breath_Point time in step S7. (Note that the comparisons in steps S6 and S7 can be considered to be continually performed while the main data and sub-information is displayed in step S5. ) If the Breath_Point is reached, then the procedure progresses to step S8. In step S8, if it is found that the Last_PTS=0, this indicates that all the main data and sub-information has already been displayed, and the procedure ends. Otherwise, step S9 is performed, in which pages of the GRAPHICS_BODY_file subsequent to the page with the Last_PTS are loaded, and the process advances at step S3 and the subsequent processing is repeated.

In step S7 however, when it is determined that the current time is not the Breath_Point, the process returns to step S5 and the decoding of the main audio/video and graphics data is performed while monitoring the PTS of the graphics data stored in cache memory 13.

Thus, by setting Breath_Point information as sub-information loading markers (indicators) at positions within the audio and video data having little effect on reproduction of the main information, the possibility of an omission or defect in the main information due to loading of the sub-information is reduced. There is no need to establish a Breath_Point (for loading) when all of the sub-information is loaded into cache memory 13 in one batch; however, if the Breath_Point is provided nevertheless, it will have no effect on the reproduction of the main information. Therefore, the limited capacity of cache memory 13 will not adversely affect the reproduction of the main information.

Figure 12:
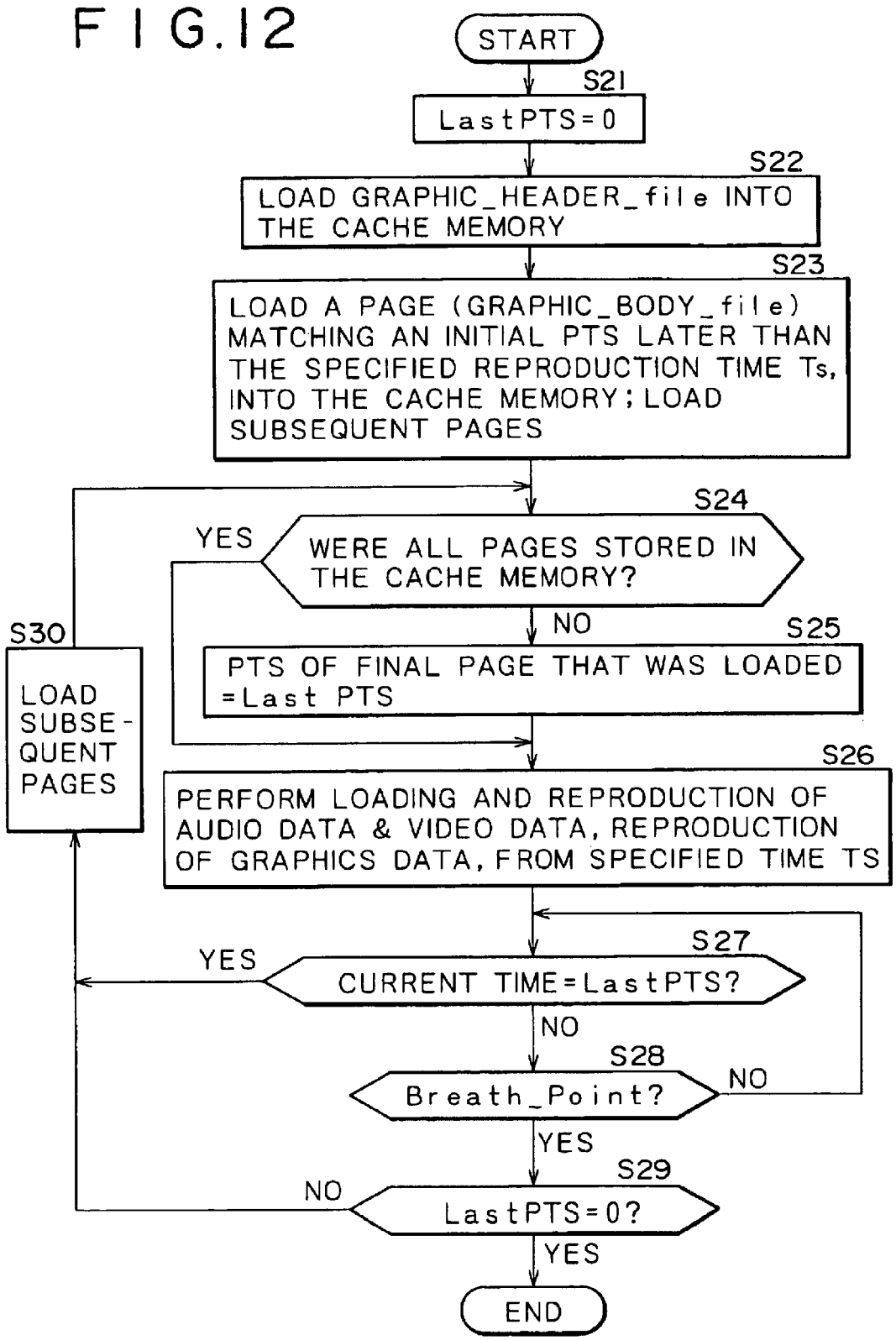

Turning now to FIG. 12, the operation of record/reproduction device 100 when selective playback is performed will be explained. More specifically, FIG. 12 illustrates a procedure for implementing playback of the recorded audio/video data and sub-information from a user-selected in-progress point of the audio/video program, i.e., a point other than the beginning of the program. The in-progress point is defined by a reproduction start time Ts specified by the user.

In step S21, the value of the LastPTS variable is set to zero. The GRAPHICS_HEADER_file is then loaded into cache memory 13 from optical disk 1 in step S22 in the same manner as described previously. In step S23, the first (initial) page of the GRAPHICS_BODY_file corresponding to the main video at the user-selected reproduction start time Ts is determined and loaded from the optical disk. The initial page is detected by determining which PTS within the GRAPHICS_HEADER_file immediately succeeds the time Ts. The GRAPHICS_BODY_files for pages following the detected initial page corresponding to the initial PTS, are then loaded into cache memory 13 until cache memory 13 is full.

In step S24, it is determined whether or not all pages of the GRAPHICS_BODY_file subsequent to the initial page have been loaded into cache memory 13. Processing subsequent to this step S24 is identical to the processing from step S3 in FIG. 11, i.e., steps S24 to S30 are identical to steps S4 to S9, and thus an explanation of the former is omitted here.

Accordingly, by storing the reproduction times or the like for the graphics data GRAPHICS_BODY_file in the GRAPHICS_HEADER_file in the above-described manner, if reproduction (playback) is commenced from an in-progress point of the audio/video program, the same general processing can be performed as when reproduction is started at the beginning. By accessing the information loaded for each conventional access unit all at once in the GRAPHICS_HEADER_file, a short access time (the time until decoding) is attained. Moreover, processing tasks such as editing are simpler to perform.

While the present invention has been described above in reference to preferred embodiments thereof, it is understood that these embodiments are merely exemplary and that one skilled in the art can make many changes to the disclosed embodiments without departing from the spirit and scope of the invention. For instance, while the above-described embodiment includes portions for implementing both recording and reproduction operations, a device with less functionality, e.g., for performing only recording or reproduction using the techniques described herein or equivalents thereto, can also be provided. Accordingly, these and other changes are intended to be included within the scope of the invention as defined by the appended claims.

What is claimed is:

1. Apparatus for recording video data, audio data and graphics data representing sub-images to be superimposed with main images of said video data, said apparatus comprising:

encoding means for encoding said graphics data and for encoding main data comprising said video and audio data;

multiplexing means for multiplexing said encoded video and audio data to provide multiplexed main data; and recording means for recording said multiplexed main data and said graphics data on a record medium, with said graphics data being recorded in at least one file separate from said multiplexed main data;

wherein said recording means records on said record medium presentation time information indicating times at which respective portions of said graphics data are to be presented for display, and arrival time information indicating times at which respective portions of said graphics data are designated to arrive at a code buffer prior to being output for display.

2. The apparatus of claim 1 wherein said arrival time information and presentation time information are recorded as at least one file separate from said main data.

3. The apparatus of claim 1, further including control means for changing said arrival time information when said graphics data is edited, and for controlling recording of said changed arrival time information.

4. Apparatus for recording video data, audio data and graphics data representing sub-images to be superimposed with main images of said video data, said apparatus comprising:

encoding means for encoding said graphics data and for encoding main data comprising said video and audio data;

multiplexing means for multiplexing said encoded video and audio data to provide multiplexed main data; and recording means for recording said multiplexed main data and said graphics data on a record medium, with said graphics data being recorded in at least one file separate from said multiplexed main data;

wherein said recording means records on said record medium reading time information indicating times for reading of said graphics data from said record medium, said times for reading corresponding to a pause in reading said main data from said record medium.

5. The apparatus of claim 4 wherein said reading time information is recorded on said record medium as a file separate from said main data.

6. The apparatus of claim 1 wherein said record medium is one of an optical disk and a magnetic disk, and said recording means comprises one of an optical head and a magnetic head.

7. The apparatus of claim 1 wherein said encoding means encodes said graphics data and main data in an MPEG (Motion Pictures Expert Group) format.

8. Apparatus for reproducing from a record medium main data including multiplexed audio and video data, and graphics data representing sub-images to be superimposed with main images of said video data, said apparatus comprising:

reading means for reading said main data from said record medium, and for reading said graphics data from said record medium as a file separate from said main data;

demultiplexing means for demultiplexing said main data into said video data and audio data;

decoding means for decoding said demultiplexed video and audio data and said graphics data;

adding means for adding said decoded video data and said graphics data to be output to a display as superimposed images; and control means for controlling the reading of said main data and graphics data;

wherein said control means controls said reading means to read from said record medium, presentation time information of said graphics data indicating times at which respective portions of said graphics data are to be presented for display, and arrival time information indicating times at which respective portions of said graphics data are designated to arrive at a code buffer prior to the display thereof, said control means controlling synchronization between said main data and said graphics data in response to the presentation time information and arrival time information.

9. The apparatus of claim 8 wherein said presentation time information and said arrival time information are read from said record medium as a file separate from said main data.

10. Apparatus for reproducing from a record medium main data including multiplexed audio and video data, and graphics data representing sub-images to be superimposed with main images of said video data, said apparatus comprising:

reading means for reading said main data from said record medium, and for reading said graphics data from said record medium as a file separate from said main data;

demultiplexing means for demultiplexing said main data into said video data and audio data; m decoding means for decoding said demultiplexed video and audio data and said graphics data;

adding means for adding said decoded video data and said graphics data to be output to a display as superimposed images; and control means for controlling the reading of said main data and graphics data;

wherein said control means includes means for controlling said reading means in response to reading time information indicating a time for reading of said graphics data from said record medium, said time for reading corresponding to a pause in reading of said main data from said record medium, said reading time information being retrieved from said record medium.

11. The apparatus of claim 10 wherein said reading time information is read from said record medium as a file separate from said main data.

12. A method for recording video data, audio data, and graphics data representing sub-images to be superimposed with main images of said video data, said method comprising:

encoding main data comprising said video and audio data;

encoding said graphics data;

multiplexing said encoded video and audio data to provide multiplexed main data;

recording said graphics data and said multiplexed main data on a record medium, with said graphics data being recorded in at least one file separate from said multiplexed main data; and recording on said record medium presentation time information indicating times at which respective portions of said graphics data are to be presented for display, and arrival time information indicating times at which respective portions of said graphics data are designated to arrive at a code buffer prior to being output for display.

13. The method of claim 12 wherein said arrival time information and presentation time information are recorded as at least one file separate from said main data.

14. The method of claim 12, further including changing said arrival time information when said graphics data is edited, and controlling recording of said changed arrival time information.

15. A method for recording video data, audio data, and graphics data representing sub-images to be superimposed with main images of said video data, said method comprising:

encoding main data comprising said video and audio data;

encoding said graphics data;

multiplexing said encoded video and audio data to provide multiplexed main data;

recording said graphics data and said multiplexed main data on a record medium, with said graphics data being recorded in at least one file separate from said multiplexed main data; and recording on said record medium reading time information indicating times for reading of said graphics data from said record medium, said times for reading corresponding to a pause in reading said main data from said record medium.

16. The method of claim 15 wherein said reading time information is recorded on said record medium as a file separate from said main data.

17. A method for reproducing from a record medium main data including multiplexed audio and video data, and graphics data representing sub-images to be superimposed with main images of said video data, said method comprising:

reading said main data from said record medium;

reading said graphics data from said record medium as a file separate from said main data;

demultiplexing said main data into said video data and audio data;

decoding said demultiplexed video and audio data and said graphics data;

adding said decoded video data and said graphics data to provide composite video to be displayed;

reading from said record medium presentation time information of said graphics data indicating times at which respective portions of said graphics data are to be presented for display, and arrival time information indicating times at which respective portions of said graphics data are designated to arrive at a code buffer prior to the display thereof; and, controlling synchronization between said main data and said graphics data in response to the presentation time information and arrival time information.

18. The method of claim 17 wherein said presentation time information and said arrival time information are read from said record medium as a file separate from said main data.

19. The method of claim 18, wherein:

said reading of said main data and said graphics data is performed from an in-progress point of a program corresponding to said main data, said in-progress point defined by an input reproduction time Ts; and, said reading of said graphics data from said in-progress point includes first determining, from said stored presentation time information, an initial presentation time immediately succeeding said reproduction time Ts, and then reading said graphics data corresponding to said initial presentation time.

20. A method for reproducing from a record medium main data including multiplexed audio and video data, and graphics data representing sub-images to be superimposed with main images of said video data, said method comprising:

reading said main data from said record medium;

reading said graphics data from said record medium as a file separate from said main data;

demultiplexing said main data into said video data and audio data;

decoding said demultiplexed video and audio data and said graphics data;

adding said decoded video data and said graphics data to provide composite video to be displayed; and retrieving from said record medium reading time information indicating a time for reading said graphics data from said record medium, said time for reading corresponding to a pause in reading of said main data from said record medium.

21. The method of claim 20 wherein said reading time information is read from said record medium as a file separate from said main data.

22. A method for recording video data, audio data, and graphics data representing sub-images to be superimposed with main images of said video data, said method comprising:

receiving main data comprised of encoded and time division multiplexed video and audio data;

providing said graphics data;

recording said graphics data and said multiplexed main data on a record medium, with said graphics data being recorded in at least one file separate from said multiplexed main data; and recording on said record medium presentation time information indicating times at which respective portions of said graphics data are to be presented for display, and arrival time information indicating times at which respective portions of said graphics data are designated to arrive at a code buffer prior to being output for display.

23. A record medium readable by a machine, having a stored program containing instructions executable by the machine to carry out a method of controlling a recording apparatus to record video data, audio data, and graphics data representing sub-images to be superimposed with main images of said video data, said method comprising the steps of:

providing said graphics data;

recording said graphics data and said main data on a record medium, said main data being encoded and multiplexed prior to said recording, and said graphics data being recorded in at least one file separate from said multiplexed main data; and recording on said record medium presentation time information indicating times at which respective portions of said graphics data are to be presented for display, and arrival time information indicating times at which respective portions of said graphics data are designated to arrive at a code buffer prior to being output for display.

24. The record medium of claim 23 wherein said method further comprises recording said arrival time information and said presentation time information as at least one file separate from said main data.

25. The record medium of claim 23 wherein said method further includes changing said arrival time information when said graphics data is edited, and controlling recording of said changed arrival time information.

26. A record medium readable by a machine, having a stored program containing instructions executable by the machine to carry out a method of controlling a recording apparatus to record video data, audio data, and graphics data representing sub-images to be superimposed with main images of said video data, said method comprising the steps of:

providing said graphics data;

recording said graphics data and said main data on a record medium, said main data being encoded and multiplexed prior to said recording, and said graphics data being recorded in at least one file separate from said multiplexed main data; and recording on said record medium reading time information indicating times for reading of said graphics data from said record medium, said times for reading corresponding to a pause in reading said main data from said record medium.

27. The record medium of claim 26, wherein said method further comprises recording said reading time information on said record medium as a file separate from said main data.

28. A record medium readable by a machine, having a stored program containing instructions executable by the machine to carry out a method of reproducing from a storage medium main data including multiplexed audio and video data, and graphics data representing sub-images to be superimposed with main images of said video data, said method comprising:

reading said main data from said storage medium;

reading said graphics data from said storage medium as a file separate from said main data;

demultiplexing said main data into said video data and audio data;

decoding said demultiplexed video and audio data and said graphics data;

adding said decoded video data and said graphics data to provide composite video to be displayed;

reading from said record medium presentation time information of said graphics data indicating times at which respective portions of said graphics data are to be presented for display, and arrival time information indicating times at which respective portions of said graphics data are designated to arrive at a code buffer prior to the display thereof; and, controlling synchronization between said main data and said graphics data in response to the presentation time information and arrival time information.

29. The record medium of claim 28 wherein said method further comprises reading said presentation time information and said arrival time information from said storage medium as a file separate from said main data.

30. A record medium readable by a machine, having a stored program containing instructions executable by the machine to carry out a method of reproducing from a storage medium main data including multiplexed audio and video data, and graphics data representing sub-images to be superimposed with main images of said video data, said method comprising:

reading said main data from said storage medium;

reading said graphics data from said storage medium as a file separate from said main data;

demultiplexing said main data into said video data and audio data;

decoding said demultiplexed video and audio data and said graphics data;

adding said decoded video data and said graphics data to provide composite video to be displayed; and retrieving from said storage medium reading time information indicating a time for reading said graphics data from said record medium, said time for reading corresponding to a pause in reading of said main data from said record medium.

31. The record medium of claim 30, wherein said method further comprises reading said reading time information from said storage medium as a file separate from said main data.

32. An apparatus for recording video data, audio data and graphics data representing sub-images to be superimposed with main images of said video data, said apparatus comprising:

a system controller for controlling recording, on a record medium, of said audio and video data as encoded and multiplexed data, and for controlling recording of said graphics data on said record medium in at least one file separate from said audio and video data; and at least one recording head for recording said audio and video data and said graphics data on said record medium under the control of said system controller;

wherein said at least one recording head records on said record medium presentation time information indicating times at which respective portions of said graphics data are to be presented for display, and arrival time information indicating times at which respective portions of said graphics data are designated to arrive at a code buffer prior to being output for display.

33. The apparatus of claim 32 wherein said arrival time information and presentation time information are recorded as at least one file separate from said multiplexed audio and video data.

* * * * *